E. H. Wheeler.
Harvester Rake.
No. 31275.
Patented Jan. 29, 1861.
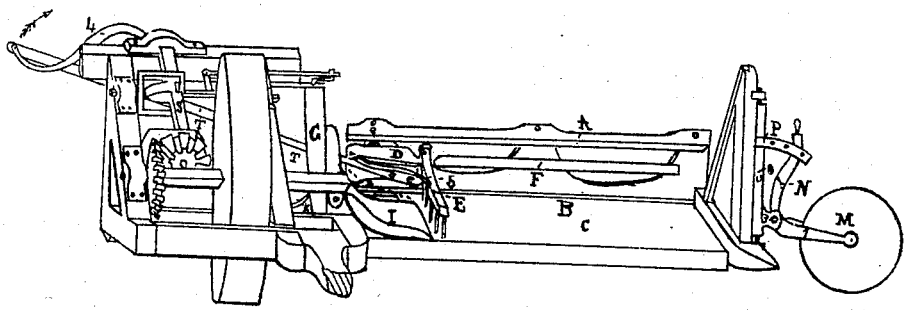
No. 1
PERSPECTIVE VIEW
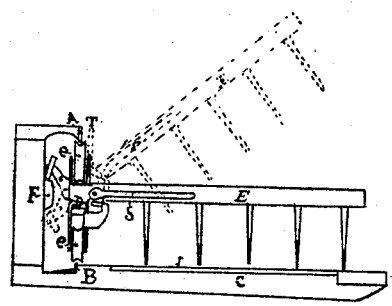
No. 2
VIEW OF RAKE
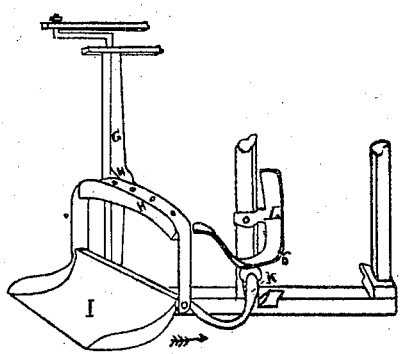
No. 3
REVOLVING CONCAVE
Attest
James R. Buckingham
E. W. Strong
Elisha H. Wheeler

UNITED STATES PATENT OFFICE.

ELISHA H. WHEELER, OF KEOKUK, IOWA.

IMPROVEMENT IN HARVESTING-MACHINES.

Specification forming part of Letters Patent No. 31,275, dated January 29, 1861.

*To all whom it may concern:*

Be it known that I, E. H. WHEELER, of Keokuk, in the county of Lee and State of Iowa, have invented a new and useful Improvement in Harvesting-Machines; and I do hereby declare the following to be a full and exact description of my invention.

My invention consists in certain improvements in the mechanism for depositing the gavels of grain upon the ground at intervals, as hereinafter described.

To enable others skilled in the art to make and use my invention, I will proceed to describe its construction.

I take a harvester of the form represented in the accompanying drawings, Figure No. 1, and construct railways A and B, one being directly over the other, both extending along the back part of grain-platform C its entire length, and a car, D, supported on three grooved rollers, e e e, running on railway-tracks A and B, and attach to car D rake-head E, with an arm, o, extending through behind car D, and having a roller, i, on its end, and a guide-track, F, on which roller i runs, and a revolving concave consisting of shaft G, arm H, concave I, arm K, and guide-plate L. (Drawings No. 3.)

Operation: As the machine moves forward, it gives motion to shaft S by means of cog-wheels, as seen in Drawing No. 1, and causes the crank 4 to rotate in the direction of the arrow, the pitman T being attached to the car D. As the crank is elevated, pitman T comes in contact with brace 5 of the rake and causes the rake-head to be elevated to the position represented by the dotted lines in Drawing No. 2, causing the roller i to pass from the upper to the lower side of guide-track F, and as the crank moves on, the car D is driven to the opposite end of the platform C, the rake being kept above the platform by roller i running on the under side of guide-track F until it arrives at the other end, when the roller passes out beyond the end of the track and lets the rake fall to the platform. As the rake returns, it is held down to the platform by the roller i running on the upper side of guide-track F until it reaches the position as seen in Drawing No. 1, when it delivers the shaft into the revolving concave I. As shaft S revolves, it gives motion to the concave by means of the cam-wheel, rod, and crank, as represented in the accompanying drawings, causing the concave I to rotate one-fourth part of a circle in the direction of the arrow. As it rotates, the concave is elevated by roller on arm K running down the curve of guide-plate L, as seen in Drawing No. 3. As it moves on, the arm K passes the point 6, the concave falls, and deposits the sheaf at right angles to the course of the machine. The concave then returns to its original position, as seen in Sketch No. 1.

What I claim as new, and desire to secure by Letters Patent, is—

The raking attachment consisting of the railways A and B, car D, rake E, with its arm o, roller i, and guide-track F, in combination with revolving concave I, arm and roller k, and guide-plate L, when arranged and operating substantially as set forth.

ELISHA H. WHEELER.

Witnesses:
H. S. FARRAR,
J. M. HIATT.